(12) United States Patent
Hashizume

(10) Patent No.: US 7,469,451 B2
(45) Date of Patent: Dec. 30, 2008

(54) HINGE ASSEMBLY

(75) Inventor: Kenichi Hashizume, Gunma (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/740,006

(22) Filed: Dec. 18, 2003

(65) Prior Publication Data

US 2005/0132536 A1    Jun. 23, 2005

(51) Int. Cl.
E05D 9/00    (2006.01)
(52) U.S. Cl. ............................ 16/386; 16/225; 16/226; 16/342
(58) Field of Classification Search ................. 16/386, 16/225 X, 226 X, 227, 342 X; 403/91, 87; 248/291; 381/681
See application file for complete search history.

(56) References Cited

U.S. PATENT DOCUMENTS

| | | | | | |
|---|---|---|---|---|---|
| 4,781,422 | A | * | 11/1988 | Kimble | 361/680 |
| 4,959,887 | A | * | 10/1990 | Gruenberg et al. | 16/223 |
| 5,088,156 | A | * | 2/1992 | Hosoi | 16/342 |
| 5,131,779 | A | * | 7/1992 | Sen | 403/91 |
| 5,498,165 | A | * | 3/1996 | Tseng | 439/31 |
| 5,606,730 | A | * | 2/1997 | Rush et al. | 455/575.3 |
| 5,681,176 | A | * | 10/1997 | Ibaraki et al. | 439/165 |
| 5,751,544 | A | * | 5/1998 | Song | 361/681 |
| 5,995,373 | A | * | 11/1999 | Nagai | 361/755 |
| 6,091,601 | A | * | 7/2000 | Schlesener et al. | 361/681 |
| 6,301,468 | B1 | * | 10/2001 | Slayton et al. | 455/575.3 |
| 6,439,905 | B2 | * | 8/2002 | Andrews et al. | 439/165 |
| 6,484,016 | B1 | * | 11/2002 | Cheon | 455/90.1 |
| 6,650,547 | B2 | * | 11/2003 | Hemmi et al. | 361/755 |
| 6,873,520 | B2 | * | 3/2005 | Takagi et al. | 361/679 |
| 6,895,638 | B2 | * | 5/2005 | Lin | 16/368 |

OTHER PUBLICATIONS

Patent Abstracts of Japan; NEC Corp, Saitama Nippon Denki KK; "Portable Telephone Set"; Pub. No. 06-311216, Pub. Date Nov. 4, 1994.
Patent Abstracts of Japan; NEC Saitama Ltd.; "Foldable Portable Communication Equipment"; Pub. No. 11-163986, Pub. Date Jun. 18, 1999.
Patent Abstracts of Japn; Matsushita Electric Ind Co Ltd.; "Folding Portable Telephone Set"; Pub. No. 20002-051131, Pub. Date Feb. 15, 2002.

* cited by examiner

*Primary Examiner*—Patricia Engle
*Assistant Examiner*—Mark Williams
(74) *Attorney, Agent, or Firm*—Harrington & Smith, PC

(57) ABSTRACT

A hinge assembly comprising first and second hinge elements rotatably mounted relative to each other and a plurality of elongate flexible members connected to the first and second hinge elements and extending there between, the elongate members being twisted about a longitudinal axis to a first condition prior to assembly the hinge assembly, wherein the hinge elements are rotatably movable from a first position in which the elongate members are in said first condition to a second position in which the elongate members are in a second condition.

34 Claims, 2 Drawing Sheets

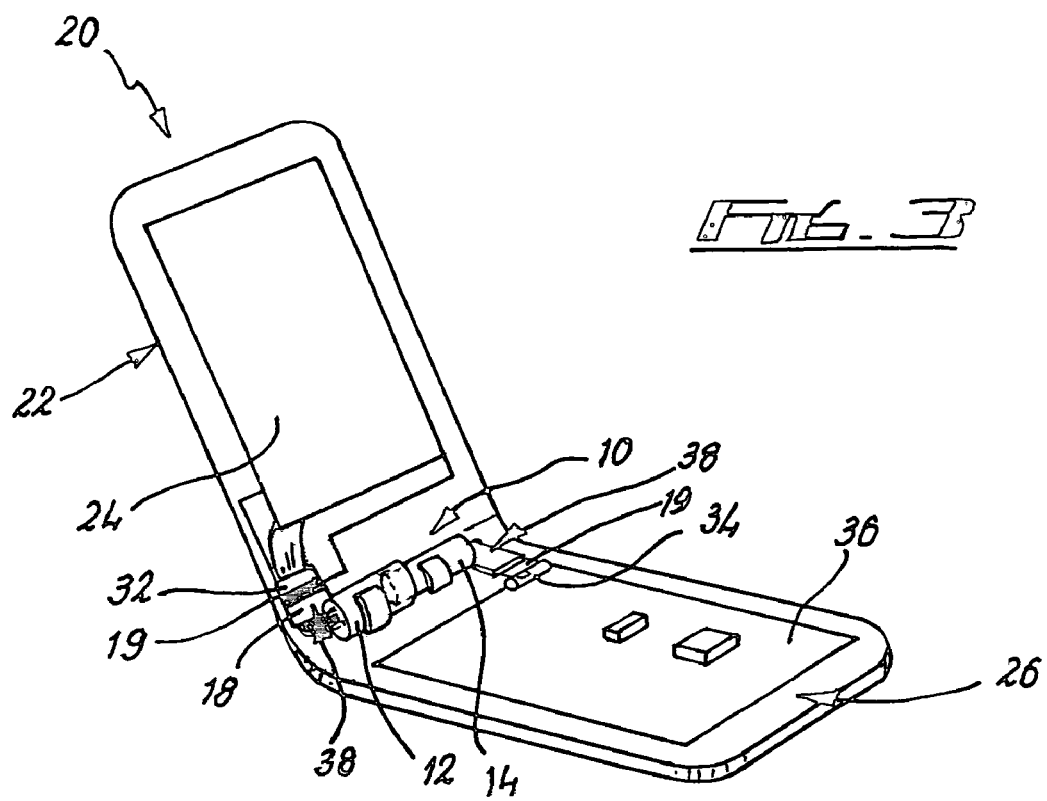
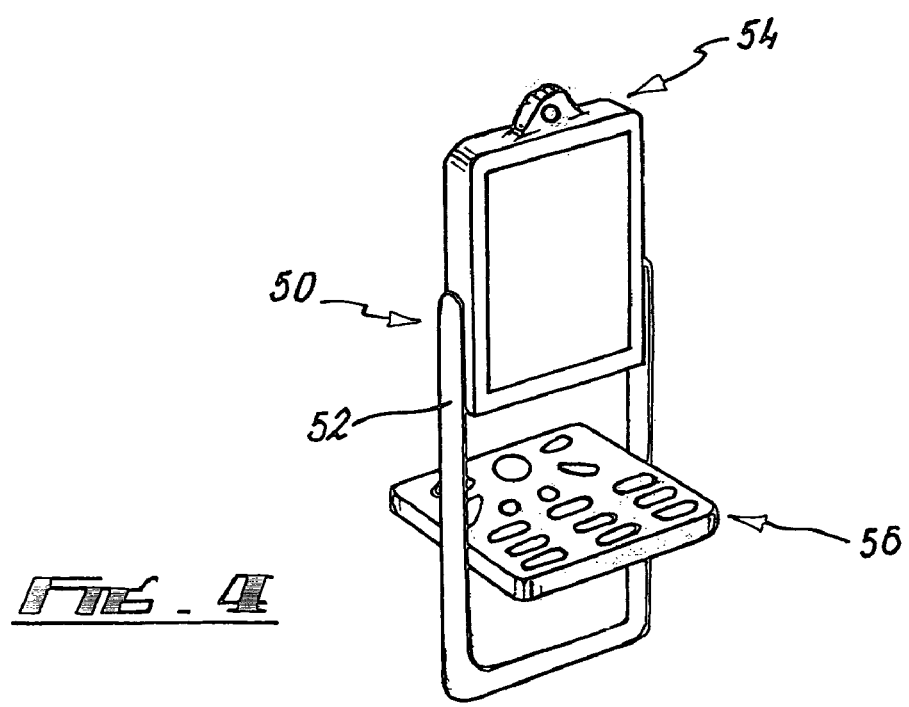

HINGE ASSEMBLY

One embodiment of this invention relates to hinge assemblies. More particularly, but not exclusively, one embodiment of this invention relates to hinge assemblies for a radio terminal, such as a mobile phone.

Foldable mobile phones are known. Such phones are of the type which comprise a first section incorporating the keypad and a second section incorporating the screen where the first and second sections are foldable relative to each other about a hinge between open and closed positions. However, such phones require cabling to be passed from one section to the other and this can cause stress related problems at the hinge between the two sections.

According to one aspect of this invention, there is provided a hinge assembly comprising first and second hinge elements rotatably mounted relative to each other, and a plurality of elongate flexible members extending between the first and second hinge elements, the elongate members being twisted about a longitudinal axis to a first condition prior to assembling the hinge assembly, wherein the hinge elements are rotatably movable from a first position in which the elongate members are in said first condition, to a second position in which the elongate members are in a second condition.

According to another aspect of this invention, there is provided a hinge assembly comprising first and second hinge elements relatively pivotable about a hinge axis, and a plurality of elongate flexible members extending between the first and second hinge elements along said hinge axis.

At least one embodiment of the invention will now be described by way of example only, with reference to the accompanying drawings, in which:

FIG. 3 is a diagrammatic perspective view of a mobile phone incorporating a hinge assembly; and FIG. 4 is a diagrammatic perspective view of a further embodiment of a mobile phone incorporating a hinge assembly.

Figure 1:
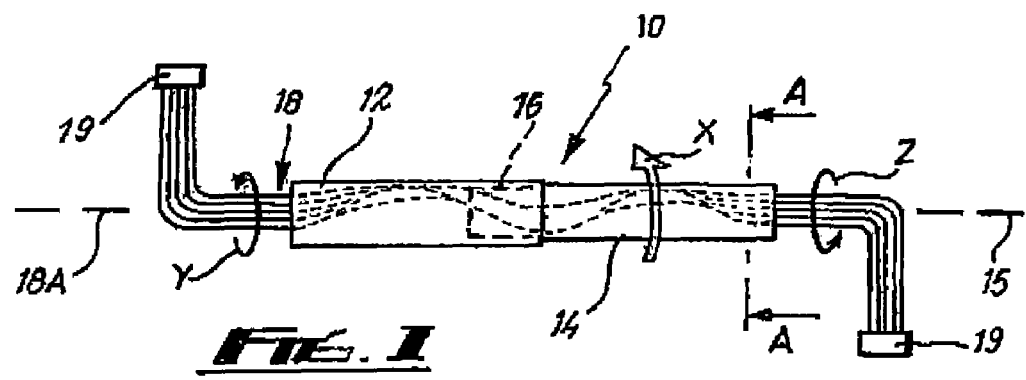
FIG. 1 is a diagrammatic front view of a hinge assembly.

Referring to FIG. 1, there is shown a hinge assembly 10 for use as an electronic device incorporating two foldable sections, such as a foldable mobile phone.

The hinge assembly 10 comprises a first hinge element in the form of a first cylindrical sleeve 12 and a second hinge element in the form of a second cylindrical sleeve 14. The first and second cylindrical sleeves 12,14 are co-axial, the first cylindrical sleeve 12 having an inner diameter which is of a size to allow a portion 16 of the second cylindrical sleeve 14 to be telescopically received within the first cylindrical sleeve 12. The first and second sleeves 12, 14 have a common hinge axis 15 extending therethrough.

Figure 1A:
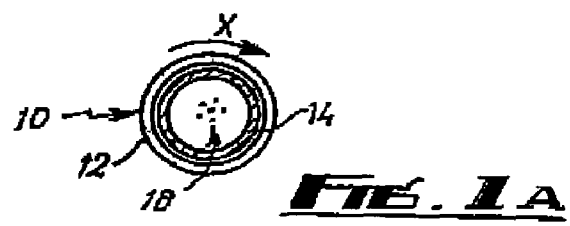
FIG. 1A is a view along the lines A-A in FIG. 1.

The hinge assembly 10 also comprises a plurality of elongate cables 18 which extend through the first and second cylindrical sleeves 12, 14 lengthwise along the hinge axis 15. Prior to being inserted into the first and second cylindrical sleeve, 12, 14, the plurality of cables 18 are twisted about their longitudinal axis 18A to a first or twisted condition, such that, when viewed along the arrows AA in FIG. 1 (see FIG. 1A), the right hand end region as shown in FIG. 1, is twisted relative to the left hand end region in the clockwise direction, as shown by the arrow X in FIGS. 1 and 1A.

The cables 18 may be in the form of co-axial cables having at their respective opposite ends connectors 19 to connect the cables 18 to suitable connectors on the electronic device.

Figure 2:
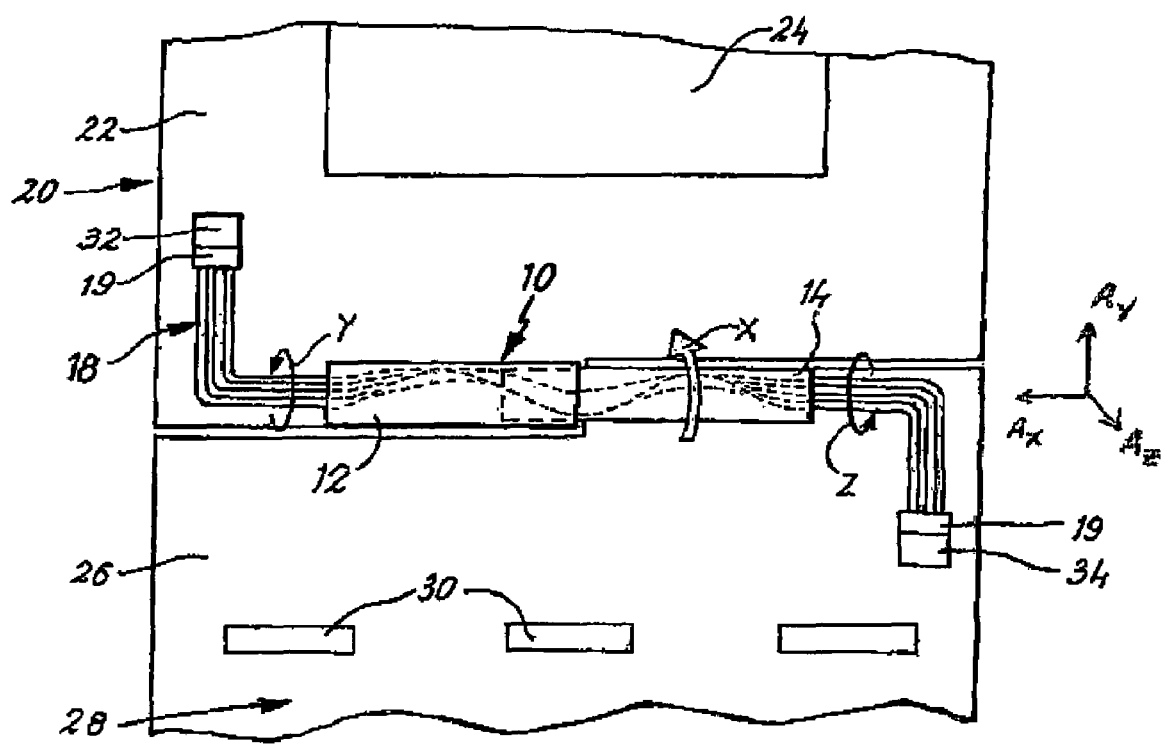
FIG. 2 is a diagrammatic front view of a region of a mobile phone showing the hinge assembly shown in FIG. 1.

Referring to FIG. 2, there is shown a hinge region of a mobile phone 20. The mobile phone 20 comprises a first section 22 incorporating a screen 24 and a second section 26 incorporating a keypad 28 and having a plurality of keys 30. The first and second section 22, 26 are hingedly attached to one another by the hinge assembly 10.

In FIG. 2, the mobile phone 20 is shown in its open position, ready for use. The mobile phone 20 also has a closed position in which the first and second sections 22, 24 lie in face to face alignment with each other. When the mobile phone 20 is moved from its closed position to its open position, the first section 22 can be pivoted relative to the second section 28 about the hinge assembly 10 in the direction shown by the arrow Y in FIGS. 1 and 2, and/or the second section 26 can be pivoted relative to the first section 22 by rotation about the hinge assembly 10 in the direction indicated by the arrow Z. The cables 18 are attached to suitable first and second connectors 32, 34 on the respective first and second sections 22, 26 of the mobile phone 20.

When the mobile phone 20 is in the closed position, the cables 18 are in their first or twisted condition, as described above. When the mobile phone is opened by pivoting the first section 12 in the direction indicated by the arrow Y or the second section 16 in the direction indicated by the arrow Z, the cables 18 are untwisted by the pivoting movement until, when the phone is in the fully opened position, the cables 30 are in their second condition which may be an untwisted or less twisted condition.

In FIG. 2, in which the phone 20 is in the open position, the cables 18 are in a less twisted condition, i.e. a condition in which the cables 18 are less twisted than when the phone is in its closed position. The angle to which the cables 18 are pre-twisted in the first condition is equal to or greater than the angle about which the first and second sections 22, 26 pivot when moving from the closed to the open positions or from the closed to the open position.

The twisting of the cables 18, as described above, prior to insertion into the first and second cylindrical sleeves 12, 14 causes the cables 18 to curve, about axes generally transverse to the longitudinal axis 18A of the cables 18. FIGS. 1 and 2 show this curving of the cable. This curving of the cables 18 has a radius which is preferably greater than ten times the inner radius of the second sleeve 14. In some embodiments, the curving of the cables 18 has a radius which is greater than twenty times the inner radius of the second sleeve 14.

In order to prevent friction between the cables 30 and the inside wall of the sleeves 12, 14, the cross-sectional area occupied by the cables 30 should be less than half of the inner cross-sectional area of the first sleeve 12.

Reference is now made to table 1 below which shows the various dimensions of the second sleeves, 14 and the cables 18.

TABLE 1

| Cable diameter (mm) | 0.3 | 0.3 | 0.3 | 0.3 | 0.3 | 0.3 | 0.3 | 0.3 | 0.3 | 0.3 | 0.3 |
|---|---|---|---|---|---|---|---|---|---|---|---|
| Number of cables | 20 | 30 | 40 | 50 | 60 | 70 | 80 | 90 | 100 | 110 | 120 |
| Combined length of first and second sleeves | 11.5 | 14 | 17 | 18 | 20 | 21 | 23 | 25 | 26 | 26.5 | 27.5 |
| Rotating angle | 360 | 360 | 360 | 360 | 360 | 360 | 360 | 360 | 360 | 360 | 360 |
| Length of cable (mm) | 12.17 | 14.80 | 128.02 | 19.03 | 21.12 | 22.26 | 24.35 | 26.43 | 27.51 | 28.05 | 29.09 |
| Volume of cable (mm$^3$) | 0.86 | 1.05 | 1.27 | 1.34 | 1.49 | 1.57 | 1.72 | 1.87 | 1.95 | 1.98 | 2.06 |
| Total cable volume (mm$^3$) | 17.21 | 31.39 | 50.97 | 67.29 | 89.59 | 110.17 | 137.71 | 168.19 | 194.48 | 218.11 | 246.79 |
| Inner diameter of second sleeve | 2.00 | 2.40 | 3.00 | 3.10 | 3.40 | 3.70 | 4.00 | 4.30 | 4.50 | 4.60 | 4.75 |
| Second sleeve inner volume (mm$^3$) | 36.13 | 63.33 | 120.17 | 135.86 | 181.58 | 225.79 | 289.03 | 363.05 | 413.51 | 440.40 | 487.32 |
| Cross section area | | | | | | | | | | | |
| Cross section area of cable (mm$^2$) | 0.071 | 0.071 | 0.071 | 0.071 | 0.071 | 0.071 | 0.071 | 0.071 | 0.071 | 0.071 | 0.071 |
| Total cross section area of cables (mm$^2$) | 1.41 | 2.12 | 2.83 | 3.53 | 4.24 | 4.95 | 5.66 | 6.36 | 7.07 | 7.78 | 8.48 |
| Inner cross section area of second sleeve (mm$^2$) | 3.14 | 4.52 | 7.07 | 7.55 | 9.08 | 10.75 | 12.57 | 14.52 | 15.90 | 16.62 | 17.72 |
| Approx bending R for twisted cable (mm) | 10.27 | 12.61 | 15.04 | 16.17 | 18.11 | 18.60 | 20.53 | 22.47 | 23.28 | 23.68 | 24.65 |
| Ratio of bending R (twisted cable/simple bending) | 10.27 | 10.51 | 10.03 | 10.43 | 10.65 | 10.05 | 10.27 | 10.45 | 10.35 | 10.30 | 10.38 |

Referring to FIG. 3, there is shown a mobile phone 10 incorporating a hinge assembly 10 as described above. For the sake of clarity, the keypad 28 has been removed to show the connection of the cable 18 to the connector 34 of a printed circuit board 36.

The cables 18 are fixed to the respective first and second sections 22, 26 by suitable cable fixing members 38, as would be appreciated by persons skilled in the art.

Referring to FIG. 4, there is shown a further embodiment of a mobile phone designated 50, which comprises a frame 52 of a generally U-shaped configuration supporting a first section 54 and a second section 56. The first section 54 is pivotally mounted on the frame 52 by a hinge assembly not shown in FIG. 5 but mounted within the first section 54. This hinge assembly is similar to the hinge assembly 10 shown in FIGS. 1 to 3 above. Also, the second section 56 is pivotally attached to the frame by a hinge assembly (not shown) similar to the hinge assembly 10 shown above.

Although the above described embodiment has been described in which the cables 18 are moved to an untwisted second condition when the hinge opens, they could of course be arranged such that the cables 18 are in an untwisted condition when the phone is closed, and are moved to the preset twisted first condition when the mobile phone is opened. In this way, since the mobile phone 20 is in the closed condition most of the time, the cables 18 are in the least stressed condition when the first and second sections 22, 26 are in their closed position.

Whilst endeavouring in the foregoing specification to draw attention to those features of the invention believed to be of particular importance it should be understood that the Applicant Claims protection in respect of any patentable feature or combination of features hereinbefore referred to and/or shown in the drawings whether or not particular emphasis has been placed thereon.

The invention claimed is:

1. A hinge assembly comprising:
   a first hinge element mounted for rotation relative to a second hinge element about a hinge axis through a first angle in a clockwise direction from a closed configuration to an open configuration;
   a plurality of elongate flexible members extending between the first and second hinge elements along the hinge axis, and each elongate flexible member having a portion which is generally longitudinally orientated along the hinge axis and, when the first and second hinge elements are in the closed configuration, the plurality of elongate flexible members are longitudinally axially twisted in a clockwise direction through a second angle as they travel from the first hinge element to the second hinge element along the hinge axis, wherein the magnitude of the second angle is greater than the magnitude of the first angle; and
   wherein relative movement of the first hinge element and the second hinge element from the closed configuration to the open configuration partially untwists the plurality of elongate flexible members so that they remain twisted in the clockwise direction but through a third angle as they travel from the first hinge element to the second hinge element along the hinge axis, wherein the third angle is less than the second angle, and wherein the third angle is less than the first angle.

2. A hinge assembly according to claim 1 wherein the elongate flexible members extend through the first and second hinge elements.

3. A hinge assembly according to claim 1 wherein the first and second hinge elements are pivotable about a hinge axis, and the elongate flexible members extend along the hinge axis between said first and second hinge elements.

4. A hinge assembly according to claim 1, wherein each of the first and second hinge elements comprises a substantially cylindrical sleeve through which the elongate flexible members extend.

5. A hinge assembly according to claim 4 wherein the hinge elements overlap each other.

6. A hinge assembly according to claim 5 wherein the hinge elements are co-axial with each other.

7. A hinge assembly according to claim 4 wherein the aggregate cross-sectional area of the elongate flexible members is less than about 80% of the cross-sectional area of at least one of the hinge elements.

8. A hinge assembly according to claim 7 wherein the aggregate cross-sectional area of the elongate flexible members is less than about 65% of the cross-sectional area of at least one of the hinge elements.

9. A hinge assembly according to claim 7 wherein the aggregate cross-sectional area of the elongate flexible members is less than about 50% of the cross-sectional area of at least one of the hinge element.

10. A hinge assembly according to claim 1 wherein when the elongate flexible members are twisted in the clockwise direction and the hinge elements are in the closed position, the elongate flexible members are curved about the hinge axis.

11. A hinge assembly according to claim 10 wherein the first and second hinge elements are cylindrical, having a radius, and the curved elongate flexible members have a radius of curvature which is greater than the radius of at least one of the hinge elements.

12. A hinge assembly according to claim 11 wherein the radius of the curvature of the curved elongate flexible members is greater than two times the radius of at least one of the hinge elements.

13. A hinge assembly according to claim 12 wherein the radius of curvature of the curved elongate flexible members is greater than five times the radius of at least one of the hinge elements.

14. A hinge assembly according to claim 12 wherein the radius of curvature of the curved elongate flexible members is greater than ten times the radius of at least one of the hinge elements.

15. A hinge assembly according to claim 12 wherein the radius of curvature of the curved elongate flexible members is greater than twenty times the radius of at least one of the hinge elements.

16. A hinge assembly according to claim 1 wherein the elongate flexible metnbers are in the form of electrical cables.

17. A hinge assembly according to claim 16 wherein the elongate flexible members are in the form of co-axial cables.

18. A hinge assembly according to claim 1 incorporating a stop member to prevent movement of the first and second binge elements beyond a pre-determined position.

19. A hinge assembly according to claim 18 wherein the elongate flexible members extend through the first and second hinge elements.

20. A hinge assembly according to claim 18 wherein each of the first and second hinge elements comprises a substantially cylindrical sleeve through which the elongate flexible members extend.

21. A hinge assembly according to claim 20 wherein the aggregate cross-sectional area of the elongate flexible members is less than about 80% of the cross-sectional area of at least one of the hinge elements.

22. A hinge assembly according to claim 20 wherein the aggregate cross-sectional area of the elongate flexible members is less than about 65% of the cross-sectional area of at least one of the hinge elements.

23. A hinge assembly according to claim 20 wherein the aggregate cross-sectional area of the elongate flexible members is less than about 50% of the cross-sectional area of at least one of the hinge elements.

24. A mobile phone comprising first and second relatively movable sections and a hinge assembly according to claim 1 connecting the first section to the second section.

25. An electronic device, comprising a first section, a second section, and a frame connecting the first section to the second section, wherein at least one of the first and second sections is connected to the frame by a hinge assembly according to claim 1.

26. A hinge assembly as claimed in claim 1, wherein the plurality of elongate flexible members are twisted in the clockwise direction through the second angle prior to assembly of the hinge assembly.

27. A hinge assembly comprising:
a first hinge element having an outer extremity;
a second hinge element having an outer extremity;
wherein a hinge axis extends through the first and second hinge elements between the outer extremity of the first hinge element and the outer extremity of the second hinge element, wherein the first and second hinge elements are relatively pivotable about the hinge axis; and
the hinge assembly further comprises
a plurality of elongate flexible members longitudinally extending along the hinge axis and outwardly past the outer extremities of the first and second hinge elements, and each elongate flexible member having a portion which is orientated along the hinge axis, wherein the portions are axially twisted about the hinge axis in a same first direction of twist both when the hinge elements are in an open position and when the hinge elements are in a closed position.

28. A hinge assembly according to claim 27 wherein the elongate flexible members are in the form of electrical cable.

29. A hinge assembly according to claim 28 wherein the elongate flexible members are in the form of co-axial cables.

30. A hinge assembly according to claim 27 incorporating a stop member to prevent movement of the first and second hinge elements beyond a predetermined position.

31. A mobile phone comprising first and second relatively movable sections and a hinge assembly according to claim 27 connecting the first section to the second section.

32. An electronic device comprising a first section, a second section and a frame connecting the first section to the second section, wherein at least one of the first and second sections is connected to the frame by a hinge assembly according to claim 27.

33. A hinge assembly comprising:
a first hinge element mounted for rotation relative to a second hinge element about a hinge axis through a first angle in an anti-clockwise direction from an open configuration to a closed configuration;
a plurality of elongate, flexible members extending between the first and second hinge elements along the hinge axis, and each having a portion which is orientated along the hinge axis and, when the first and second hinge elements are in the open configuration, the plurality of elongate flexible members are axially twisted in an anti-clockwise direction through a second angle as they travel from the first hinge element to the second hinge element along the hinge axis, wherein the magnitude of the second angle is greater than the magnitude of the first angle; and
wherein relative movement of the first hinge element and the second hinge element from the open configuration to the closed configuration partially untwists the plurality of elongate flexible members so that they remain twisted in the anti-clockwise direction but through a third angle as they travel from the first hinge element to the second hinge element along the hinge axis, wherein the third angle is less than the second angle.

34. A mobile phone comprising:
a first section;
a second section moveable relative to the first section; and
a hinge assembly movably connecting the first section to the second section, wherein the hinge assembly comprises:
a first hinge element mounted for rotation relative to a second hinge element about a hinge axis through a first angle in a clockwise direction from a closed configuration to an open configuration;

a plurality of elongate flexible members extending between the first and second hinge elements along the hinge axis, and each having a portion which is orientated along the hinge axis and, when the first and second hinge elements are in the closed configuration, the plurality of elongate flexible members are axially twisted in a clockwise direction through a second angle as they travel from the first hinge element to the second hinge element along the hinge axis, wherein the magnitude of the second angle is greater than the magnitude of the first angle; and wherein relative movement of the first hinge element and the second hinge element from the closed configuration to the open configuration partially untwists the plurality of elongate flexible members so that they remain twisted in the clockwise direction but through a third angle as they travel from the first hinge element to the second hinge element along the hinge axis, wherein the third angle is less than the second angle.

* * * * *

UNITED STATES PATENT AND TRADEMARK OFFICE
CERTIFICATE OF CORRECTION

| | | |
|---|---|---|
| PATENT NO. | : 7,469,451 B2 | Page 1 of 1 |
| APPLICATION NO. | : 10/740006 | |
| DATED | : December 30, 2008 | |
| INVENTOR(S) | : Hashizume | |

It is certified that error appears in the above-identified patent and that said Letters Patent is hereby corrected as shown below:

Claim 16: Column 5, line 31, delete "metnbers" and replace with --members--.

Claim 18: Column 5, line 36, delete "binge" and replace with --hinge--.

Signed and Sealed this

Seventh Day of April, 2009

JOHN DOLL
*Acting Director of the United States Patent and Trademark Office*